(12) United States Patent
Smith

(10) Patent No.: US 6,594,352 B1
(45) Date of Patent: Jul. 15, 2003

(54) METHOD AND SYSTEM FOR AUTOMATICALLY PROVIDING A CUSTOMER BILLING IDENTIFIER FOR A DIRECTORY ASSISTANCE EXTENSION CALL TO A SWITCH IN A PUBLIC TELEPHONE NETWORK

(75) Inventor: Michael R. Smith, Lubbock, TX (US)

(73) Assignee: Operator Service, Lubbock, TX (US)

( * ) Notice: Subject to any disclaimer, the term of this patent is extended or adjusted under 35 U.S.C. 154(b) by 0 days.

(21) Appl. No.: 09/311,950

(22) Filed: May 14, 1999

(51) Int. Cl.[7] .................. H04M 15/00; H04M 3/42; H04M 7/00
(52) U.S. Cl. .................. 379/114.01; 379/114.03; 379/114.05; 379/201.01; 379/218.01; 379/218.02; 379/223
(58) Field of Search .................. 379/114, 115, 379/118, 120, 121, 133, 88.01, 201, 220, 222, 223, 229, 114.01, 114.03, 114.05, 114.28, 201.01, 211.01, 213.01, 218.01, 218.02; 455/414, 415, 405, 406

(56) References Cited

U.S. PATENT DOCUMENTS

| | | | |
|---|---|---|---|
| 5,267,304 A | | 11/1993 | Slusky |
| 5,339,352 A | * | 8/1994 | Armstrong et al. ...... 379/88.01 |
| 5,353,335 A | | 10/1994 | D'Urso et al. |
| 5,479,488 A | * | 12/1995 | Lennig et al. ............... 379/67 |
| 5,488,652 A | | 1/1996 | Bielby et al. |
| 5,509,049 A | * | 4/1996 | Peterson .................... 379/212 |
| 5,559,871 A | | 9/1996 | Smith |
| 5,613,006 A | | 3/1997 | Reese |
| 5,684,866 A | * | 11/1997 | Florindi et al. ............. 379/114 |
| 5,684,867 A | * | 11/1997 | Gesslein, Jr. et al. ........ 379/115 |
| 5,737,700 A | | 4/1998 | Cox et al. |
| 5,892,820 A | * | 4/1999 | Armstrong et al. ......... 379/213 |
| 5,898,771 A | * | 4/1999 | Florindi et al. ............. 379/260 |
| 5,903,639 A | * | 5/1999 | Lipchock et al. ........... 379/220 |
| 5,926,754 A | * | 7/1999 | Cirelli et al. ................ 455/414 |
| 6,035,190 A | * | 3/2000 | Cox et al. .................... 455/414 |
| 6,052,439 A | * | 4/2000 | Gerszberg et al. ....... 379/88.01 |
| 6,058,179 A | * | 5/2000 | Shaffer et al. .............. 379/220 |
| 6,149,353 A | | 11/2000 | Nilsson |
| 6,157,648 A | | 12/2000 | Voit et al. |
| 6,188,761 B1 | * | 2/2001 | Dickerman et al. ......... 379/265 |
| 6,205,215 B1 | * | 3/2001 | Dombakly ................... 379/223 |
| 6,256,380 B1 | * | 7/2001 | Berkowitz et al. .......... 379/243 |
| 6,381,325 B1 | * | 4/2002 | Hanson .................. 379/218.01 |
| 6,480,598 B1 | * | 11/2002 | Reding et al. ......... 379/265.01 |

* cited by examiner

Primary Examiner—Huyen Le
Assistant Examiner—Quoc Tran
(74) Attorney, Agent, or Firm—Brian F. Russell; Bracewell & Patterson, L.L.P.

(57) ABSTRACT

A telephone network capable of handling directory assistance calls includes a switch, connection circuitry coupled between the switch and a directory assistance center, and call origination circuitry. In response to receipt of a incoming directory assistance call from the switch, the connection circuitry connects the incoming directory assistance call to the directory assistance center. Following receipt of a requested telephone number from the directory assistance center, the call origination circuitry originates an extension call to the requested telephone number on the public telephone network and transmits, in conjunction with the extension call, at least a billing identifier captured from the incoming directory assistance call. In this manner, the switch is able to automatically associate the extension call with the billing identifier captured from the incoming directory assistance call.

26 Claims, 3 Drawing Sheets

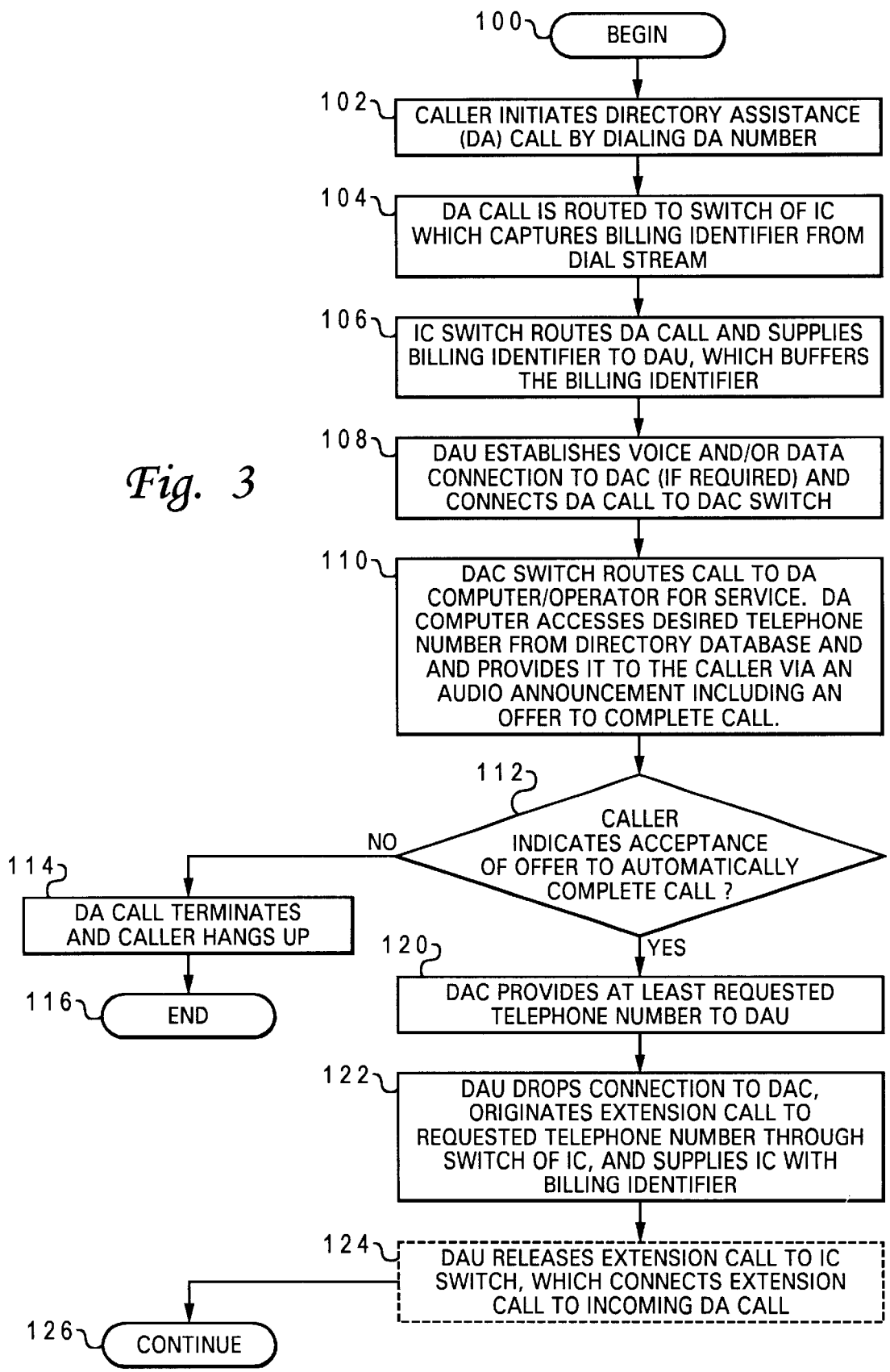

METHOD AND SYSTEM FOR
AUTOMATICALLY PROVIDING A
CUSTOMER BILLING IDENTIFIER FOR A
DIRECTORY ASSISTANCE EXTENSION
CALL TO A SWITCH IN A PUBLIC
TELEPHONE NETWORK

BACKGROUND OF THE INVENTION

1. Technical Field

The present invention relates in general to telecommunication and in particular to directory assistance services in a public telephone network. Still more particularly, the present invention relates to a method and system for automatically providing to a switch at a public telephone network the billing identifier of a customer to which a directory assistance call extension should be attributed.

2. Description of the Related Art

Conventionally, telephone companies have offered directory assistance services that provide a caller with the telephone number of a telephone customer. Typically, the caller initiates a directory assistance call by dialing a specified telephone number (e.g., NPA-555-1212, 1411, 411, or 101xxxx). The directory assistance operator or automated directory assistance system answering the directory assistance call may first request that the caller provide the locality of the customer for which a listing is desired. If listings for the requested locality are not maintained by that directory assistance center, the caller may be referred to a different directory assistance telephone number handling listings for the requested locality. If, on the other hand, the directory assistance center contacted by the caller handles listings for the requested locality, the directory assistance operator or automated directory assistance system searches the directory database for a listing corresponding the customer, and if the customer's telephone number is contained in the database and is not unlisted, provides the customer's number to the caller, typically in an audio announcement.

Until recently, the caller would have to write down (or memorize) the customer's telephone number, hang up, again go off-hook, and then dial the telephone customer's number. This procedure is inconvenient to the caller and can even be dangerous in certain situations, for example, if the caller is making the directory assistance call from a wireless telephone in a moving automobile. Thus, in order to provide enhanced directory assistance service to callers, the directory assistance centers of many telephone companies now offer the caller the option of having the directory assistance center complete a call to the customer automatically, often for a nominal fee. If the caller requests that the call be completed automatically, for example, by dialing "1", the directory assistance center originates a second call (hereinafter referred to as an extension call) to the requested telephone number via the switch through which the directory assistance center is coupled to the public telephone network.

SUMMARY OF THE INVENTION

The present invention recognizes that although the automatic completion of a call to a customer by directory assistance is a great convenience to the caller, the handling of the directory assistance center's automatically-dialed extension call can create difficulties for telephone companies. For example, local exchange carriers (LECs) typically do not have a directory assistance center located within each local service area (e.g., LATA (Local Access and Transport Area)) to which they provide service, but instead provide directory assistance services through regional directory assistance centers accessible to a number of local service areas through a TOPS (Traffic Operator Position System). If a customer served by a LEC dials the local directory assistance access number (e.g., 411), the directory assistance call will be routed through the switch of the local service provider over a long-haul line to the TOPS and from there to the regional directory assistance center. If the user then requests that directory assistance automatically complete the call to the requested number, the extension call will originate at the regional directory assistance center, return to the LEC via a second long-haul connection, and then be completed via the LEC to the customer premises. This series of connections will remain active for the duration of the extension call. As should thus be apparent, offering customers the option of automatic completion of local directory assistance calls is expensive and requires significant long-haul bandwidth to the regional directory assistance center in that each directory assistance call for which an extension call is made requires two separate long-haul connections.

Similarly, if a customer dials long distance directory assistance (e.g., by dialing NPA-555-1212), the inter-exchange carrier (IC) handling the call will route the call through at least one switch to a directory assistance center. If the user then requests that the directory assistance center complete the call to the requested number, the directory assistance center will originate a second call through the switch of the IC to the requested number. Because the extension call is originated by the directory assistance center and not from the caller's premises, the billing identifier (e.g., ANI (Automatic Number Identification)) of the caller will not be sent to the IC's switch in conjunction with the extension call. Thus, absent the present invention, the IC has no easy mechanism for associating long distance per-minute charges, taxes, and other expenses of extension calls to the billing identifier of the originating callers as with other long distance calls. Instead, the IC must rely on billing information provided by the directory assistance center, which may be of a different format than ordinarily used by the IC. It would therefore be desirable for the IC to be able to automatically attribute charges for extension calls with the billing identifiers of callers requesting them.

Similarly, for wireless directory assistance, extension calls originated by the directory assistance center do not provide the billing identifier of the wireless caller to the switch of the wireless service provider, meaning that the wireless service provider does not itself have a mechanism for automatically associating the call length and roaming and long distance charges (if applicable) with the caller's billing identifier.

In accordance with the present invention, these and other shortcomings of conventional directory assistance provision are overcome by a method and system for automatically supplying customer billing identifier, such as an ANI, to a switch in a public telephone network in conjunction with an extension call. A telephone network capable of handling directory assistance calls according to the present invention may include a switch, connection circuitry coupled between the switch and a directory assistance center, and call origination circuitry. In response to receipt of a incoming directory assistance call from the switch, the connection circuitry connects the incoming directory assistance call to the directory assistance center. Then, following receipt of a requested telephone number from the directory assistance center, the call origination circuitry originates an extension call to the requested telephone number on the public telephone network and transmits, in conjunction with the extension call, at least a billing identifier captured from the incoming directory assistance call. In this manner, the switch of the telephone network is able to automatically associate the extension call with the billing identifier captured from the incoming directory assistance call.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 depicts a high level logical flowchart of an exemplary method by which the telephone network of FIG. 1 handles directory assistance calls in accordance with the present invention.

DETAILED DESCRIPTION OF ILLUSTRATIVE EMBODIMENT

Figure 1:
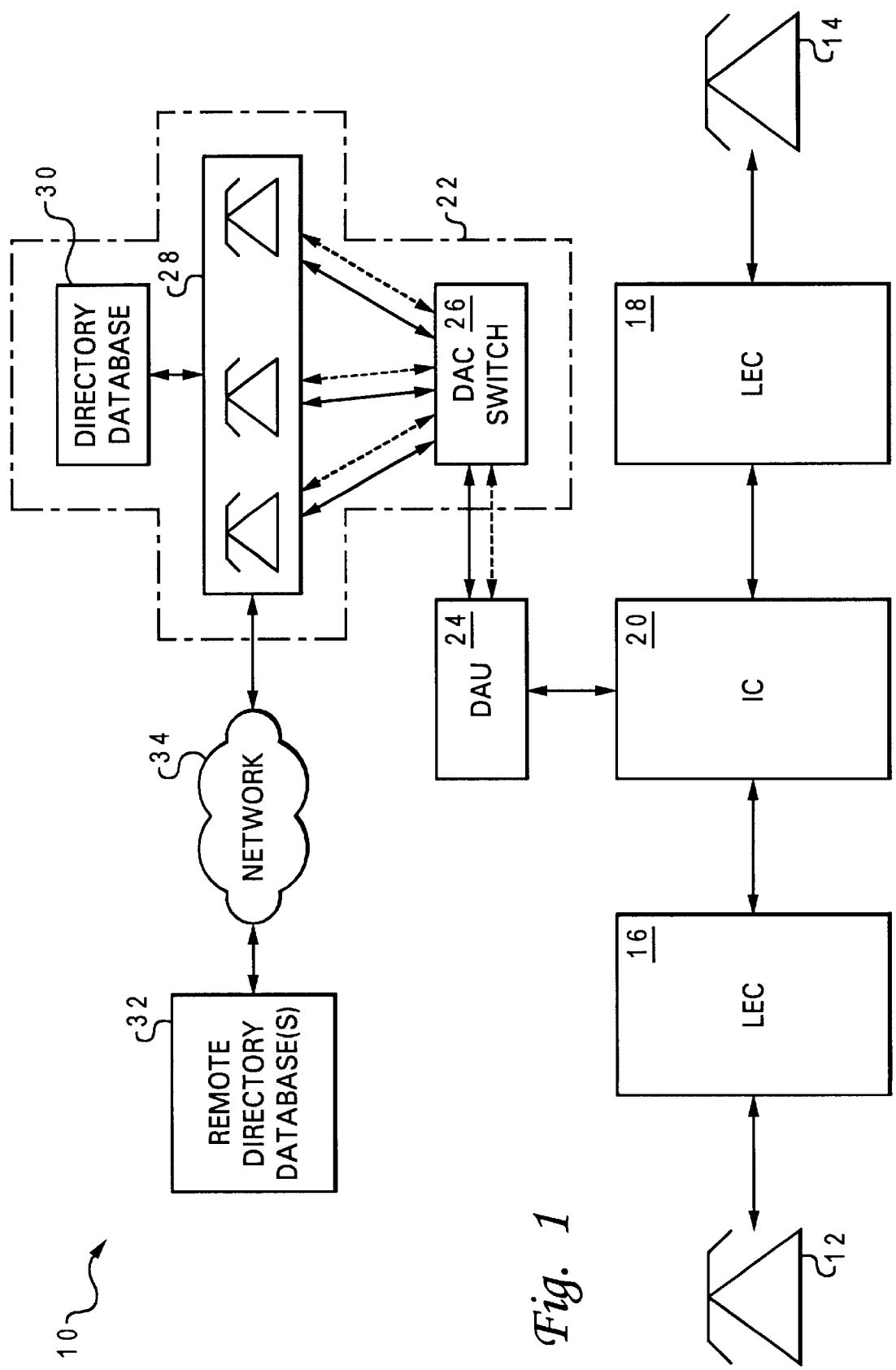
FIG. 1 depicts an illustrative embodiment of a telephone network in accordance with the present invention.

With reference now to the figures and in particular with reference to FIG. 1, there is depicted an illustrative embodiment of a telephone network in accordance with the present invention. As shown, exemplary telephone network 10, which may comprise either or both wired and wireless networks, includes customer premises equipment such as telephones 12 and 14, a number of dial-tone providers such as local exchange carriers (LECs) 16 and 18, and an interexchange carrier (IC) 20 that provides telecommunication between LECs 16 and 18. Each of LECs 16 and 18 and IC 20 may represent one or more switches. IC 20 is connectable to a directory assistance center (DAC) 22 through a directory assistance unit (DAU) 24, which in a typical implementation is located at the premises of IC 20. As illustrated, DAU 24 supports voice communication (illustrated in FIG. 1 with solid lines) and non-voice data communication (illustrated in FIG. 1 with dashed lines) to DAC 22. Such communication can be conveyed via separate analog or digital connections for voice and non-voice data or through one or more analog or digital connections that are each capable of conveying both voice and non-voice data.

DAC 22 includes a DAC switch 26 that receives and routes incoming directory assistance calls to a directory assistance computer 28, which is capable of providing directory assistance to a number of callers, either in an automated fashion or in conjunction with human directory assistance operators. Directory assistance computer 28 has access to a directory database 30 that may contain subscriber numbers, subscriber addresses, billing information, and other information. Directory assistance computer 28 may also access similar information from one or more remote directory databases 32 via a data network 34. When servicing a request for directory assistance, directory assistance computer 28 provides requested information to the caller from at least one of directory databases 30 and 32 via voice and/or data connections linking DAC switch 26, DAU 24, and IC 20.

Figure 2:
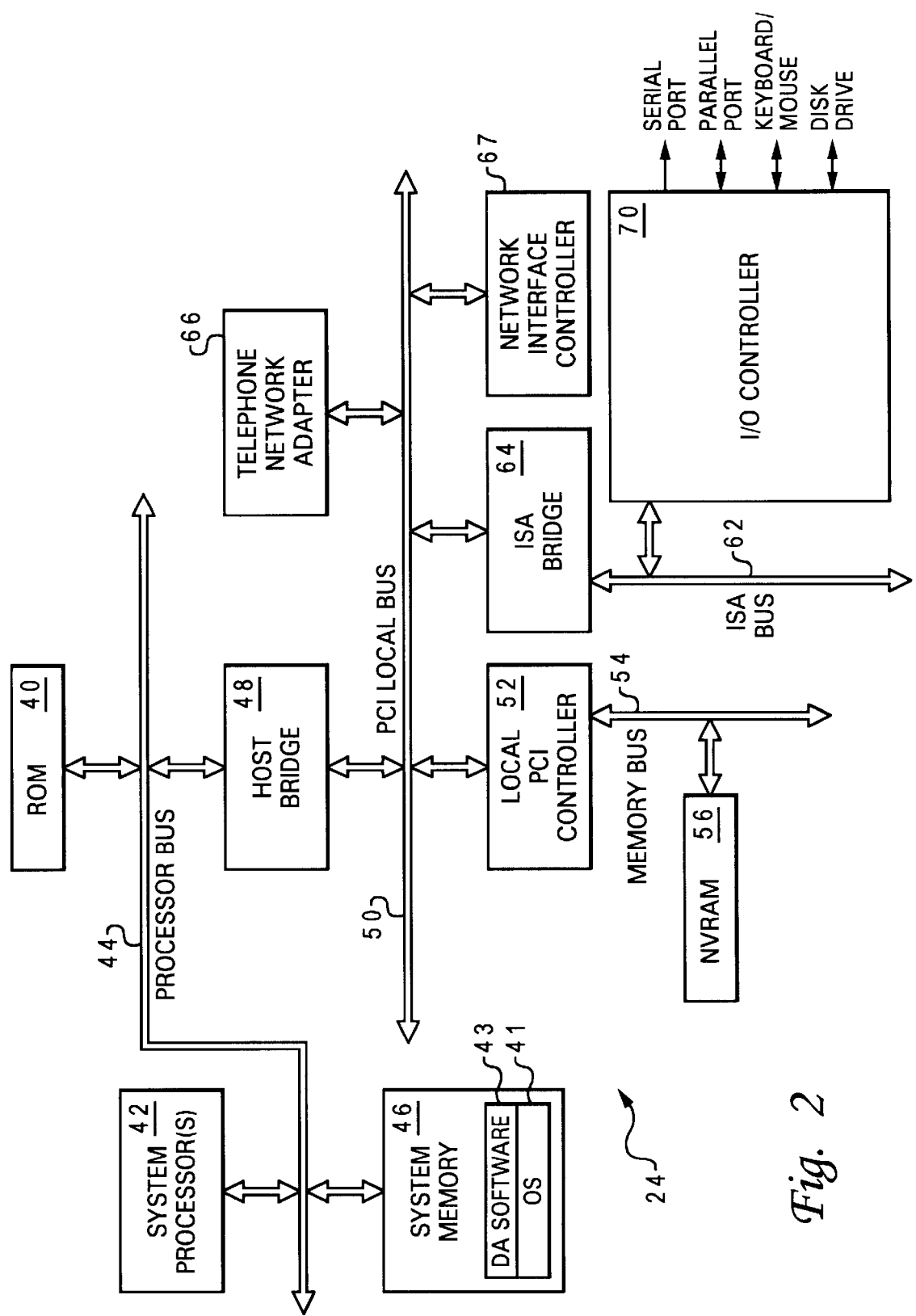
FIG. 2 is a more detailed block diagram of the directory assistance unit (DAU) of FIG. 1.

Referring now to FIG. 2, there is depicted a more detailed block diagram of an illustrative embodiment of DAU 24 of FIG. 1. In the illustrative embodiment depicted in FIG. 2, DAU 24 is a general-purpose computer system equipped with call handling hardware and specially programmed to handle directory assistance calls in accordance with the present invention. It should be understood, however, that many other hardware configurations are possible and that all such alternative hardware configurations are to be considered to be within the scope of the present invention.

As shown in FIG. 2, DAU 24 includes at least one system processor 42, which is coupled to a Read-Only Memory (ROM) 40 and a system memory 46 by a processor bus 44. System processor 42 is a general-purpose processor that executes boot code from ROM 40 at power-on and thereafter processes data under the control of an operating system 41 (e.g., Microsoft Windows™ NT) and directory assistance (DA) software 43 stored in system memory 46. System processor 42 is coupled via processor bus 44 and host bridge 48 to Peripheral Component Interconnect (PCI) local bus 50.

PCI local bus 50 is governed by local PCI controller 52, which serves as an attachment point for additional buses, devices, and bridges such as memory bus 54 and non-volatile random access memory (NVRAM) 56. PCI local bus 50 itself supports the attachment of a number of devices, including one or more telephone network adapters 66 and network interface controller (NIC) 67. NIC 67 supports communication of data (including program instructions) between DAU 24 and a data network, such as data network 34. Telephone network adapters 66, on the other hand, interface DAU 24 to the voice lines linking DAU 24 to IC 20 and to the voice and/or data lines linking DAU 24 and DAC 22. Each telephone network adapter 66 can be implemented with an off-the-shelf software-controllable telephony card, such as those manufactured by Dialogic Corporation of Parsippany, N.J. As will be appreciated by those skilled in the art, such telephone network adapters 66 can be utilized to implement a broad range of telecommunication functionality under the control of DA software 43. In accordance with the present invention, the functionality of network adapters 66 includes connecting and routing incoming directory assistance calls received from a switch of IC 20 to DAC 22 and originating extension calls to the switch of IC 20, as discussed in greater detail below with respect to FIG. 3. Thus, when implementing the functionality described below, telephone network adapters 66 comprise call connection circuitry and call origination circuitry.

DAU 24 further includes an Industry Standard Architecture (ISA) bus 62, which is coupled to PCI local bus 50 by ISA bridge 64. Coupled to ISA bus 62 is an input/output (I/O) controller 70, which permits connection of DAU 24 to attached peripheral devices, such as a keyboard, mouse, and disk drive, and supports external communication via serial and parallel ports.

With reference now to FIG. 3, there is illustrated a high level logical flowchart of an exemplary method by which telephone network 10 handles directory assistance calls in accordance with the present invention. As shown the process begins at block 100 in response to a caller taking telephone 12 off-hook. Next, at block 102 the caller initiates a long distance directory call, for example, by dialing NPA-555-1212. The directory assistance call is received by LEC 16 and routed to IC 20, as illustrated at block 104. As is conventional, the switch of IC 20 captures the billing identifier (e.g., ANI or pseudo-ANI) of the caller from the dial (or data) stream so that the incoming directory assistance call can be properly attributed and billed to the caller.

The process proceeds from block 104 to block 106, which depicts the switch of IC 20 routing the incoming directory assistance call to DAU 24 in response to the dialed directory assistance number and providing DAU 24 the billing identifier captured from the dial (or data) stream. DAU 24 temporarily buffers the billing identifier of the incoming directory assistance call for possible insertion into an extension call, as discussed further below. Next, as illustrated at block 108, DAU 24 establishes voice and/or data connections to DAC 22, if dedicated access lines are not utilized, and connects the incoming directory assistance call to DAC 22 via the voice connection. Establishing voice and/or data connections via non-dedicated lines as shown at block 108 may entail, for example, DAU 24 dialing a DID (Direct Inward Dialing) number or a toll-free (e.g., 800 or 888) number.

In response to receipt of the incoming directory assistance call, DAC switch 26 connects the call to a directory assistance operator and/or directory assistance computer 28, as depicted at block 110. Directory assistance computer 28, in response to either speech inputs from the caller or inputs from a directory assistance operator, accesses a telephone number of a requested customer (e.g., the owner of telephone 14) from one or more of directory databases 30 and 32 and supplies the desired number to the caller utilizing an audio announcement including an offer to complete a call to the desired number. Directory assistance computer 28 then determines at block 112 if the caller has accepted the offer to automatically complete the call. The determination illustrated at block 112 can be made, for example, by sensing if the caller has supplied a specified input (e.g., dialed a "1" utilizing telephone 12) or has remained on the line for a specified amount of time. If a determination is made at block 112 that the caller has not accepted the offer to complete the call, the incoming directory assistance call is terminated and the caller places telephone 12 on-hook.

If, on the other hand, directory assistance computer 28 makes a determination at block 112 that the caller has accepted the proffered offer to automatically complete the call, directory assistance computer 28 will provide a data packet to DAU 24, as shown at block 120. The data packet provided to DAU 24 contains at least the desired telephone number and may also contain applicable billing information for the extension call or the caller (i.e., billing identifier). The process then proceeds to block 122, which depicts DAU 24 dropping the voice connection to DAC 22 and originating an extension call into the switch of IC 20 utilizing the telephone number of telephone 14 that was provided by DAC 22. Importantly, in addition to the desired telephone number, DAU 24 provides the switch of IC 20 with at least the buffered billing identifier of the caller and may also supply additional billing information, if any, provided by DAC 22. In this manner, the switch of IC 20 will automatically attribute the extension call to the billing identifier of the caller as if the extension call were originated from telephone 12. Thus, IC 20 no longer needs to rely on externally-collected billing records supplied by DAC 22 to bill extension calls.

After the steps illustrated at block 122 have been performed, the caller will have a voice connection from telephone 12 through LEC 16 and IC 20 to DAU 24, which connects this first voice connection with a second voice connection extending from DAU 24 through IC 20 and LEC 18 to telephone 14. This end-to-end voice connection may be maintained for the duration of the extension call, as would be represented by the process shown in FIG. 3 passing directly from block 122 to "continue" block 126.

Alternatively, the process depicted in FIG. 3 may optionally pass to block 124, as indicated by dashed-line illustration. Block 124 depicts DAU 24 releasing the extension call into the switch of IC 20, which extends the incoming directory assistance call into the extension call, thereby terminating the involvement of DAU 24 with the incoming directory assistance call and the extension call. (Here, "extend" is defined as the interconnection of two separate calls so that an intermediary with which both calls were connected is bypassed following the interconnection.) The release of the extension call to the switch of IC 20 is beneficial in terms of freeing bandwidth in DAU 24 for use in handling additional directory assistance and extension calls. This optional step, however, may entail some additional complexity in that appropriate signaling protocols for IC switch 20 (which may be proprietary) must be provided by DAU 24 in order to instruct IC switch 20 to extend the incoming directory assistance call into the extension call originated by DAU 24.

As has been described, the present invention provides an improved method and system for providing automatic directory assistance call completion in a telephone network. In accordance with the present invention, the billing identifier provided in the dial stream of a directory assistance call is captured and provided to the switch of a public telephone network in conjunction with an extension call automatically originated by directory assistance resource. Thus, the switch of the carrier receiving the extension call automatically associates the extension call with the billing identifier of the caller for billing purposes, which may entail attributing to the caller's billing identifier the total number of minutes used and any long distance and roaming charges accrued.

While the invention has been particularly shown and described with reference to an illustrative embodiment, it will be understood by those skilled in the art that various changes in form and detail may be made therein without departing from the spirit and scope of the invention. For example, although the present invention has been described with respect to an exemplary telephone network in which the DAU is coupled to the switch of an IC, it should be understood that the DAU can alternatively be connected to the switch of a dial-tone provider such as a LEC or wireless service provider. In addition, although the present invention has been described with respect to a stand-alone DAU connected to the switch of a service provider, it should be understood that the functionality of the DAU described herein may alternatively be incorporated within the switch itself. Moreover, although aspects of the present invention have been described with respect to a computer system executing software that directs the functions of the present invention, it should be understood that present invention may alternatively be implemented as a program product or set of instructions for use with any system. Instructions defining the functions of the present invention can be delivered to such a system via a variety of signal-bearing media, which include, without limitation, non-writable storage media (e.g., CD-ROM), writable storage media (e.g., a floppy diskette or hard disk drive), and communication media, such as computer and telephone networks. It should be understood, therefore, that such signal-bearing media, when carrying or encoding instructions that direct the functions of the present invention, represent alternative embodiments of the present invention.

What is claimed is:

1. A method of handling a directory assistance call in a public telephone network, said method comprising:

in response to receipt at a directory assistance unit of an incoming directory assistance call from the public telephone network, capturing a billing identifier from said incoming directory assistance call and connecting said incoming directory assistance call to a directory assistance center;

in response to receipt of a telephone number from the directory assistance center, said directory assistance unit automatically originating an extension call to said telephone number through the switch of the public telephone network and transmitting to said switch, in conjunction with said extension call, at least said billing identifier captured from said incoming directory assistance call; and after originating said extension call, said directory assistance unit releasing the extension call into the switch and said switch connecting said incoming directory assistance call and said extension call independently of said directory assistance unit, such that said directory assistance unit is no longer involved in the connected call.

2. The method of claim 1, wherein originating said extension call comprises automatically originating said extension call only in response to receipt of caller authorization via said incoming directory assistance call.

3. The method of claim 1, wherein connecting said incoming directory assistance call to said directory assistance center comprises connecting said incoming directory assistance call to said directory assistance center through the directory assistance unit connected to the switch of the public telephone network.

4. A method of handling a directory assistance call in a public telephone network, said method comprising:

in response to receipt at a directory assistance unit connected to a switch of the public telephone network of an incoming directory assistance call from the public telephone network, capturing a billing identifier from said incoming directory assistance call and connecting said incoming directory assistance call to a directory assistance center through the directory assistance unit, wherein said connecting step further comprises establishing a connection between said directory assistance unit and said directory assistance center via a non-dedicated line;

in response to receipt of a telephone number from the directory assistance center, said directory assistance unit automatically originating an extension call to said telephone number through the switch of the public telephone network and transmitting to said switch, in conjunction with said extension call, at least said billing identifier captured from said incoming directory assistance call; and after originating said extension call, releasing the extension call into the switch and connecting said incoming directory assistance call and said extension call within the switch of said public telephone network.

5. The method of claim 3, wherein:

said connecting step further comprises establishing at least one connection, wherein said at least one connection conveys both voice and data; and said method further comprises providing said telephone number and billing information related to said extension call to said directory assistance unit via said at least one connection.

6. An apparatus for handling directory assistance calls in a public telephone network, said apparatus comprising:

connection circuitry, connectable to a public telephone network and to a directory assistance center, that connects an incoming directory assistant call received from the public telephone network to the directory assistance center; and call origination circuitry coupled to said connection circuitry that, following receipt of a telephone number from the directory assistance center, originates an extension call to said telephone number through a switch of the public telephone network and transmits to said switch, in conjunction with said extension call, at least a billing identifier captured from said incoming directory assistance call, wherein said call origination circuitry, after originating said extension call, releases said extension call to said public telephone network, such that said extension call and said incoming directory assistance call are connected together by said public telephone network independently of said apparatus and said apparatus is no longer involved in the connected call.

7. The apparatus of claim 6, wherein said call origination circuitry originates said extension call only in response to receipt of caller authorization via said incoming directory assistance call.

8. The apparatus of claim 6, wherein said connection circuitry is connectable between a switch of the directory assistance center and a switch of the public telephone network.

9. An apparatus for handling directory assistance calls in a public telephone network, said apparatus comprising:

connection circuitry, connectable between a switch of a public telephone network and a switch of a directory assistance center, that connects an incoming directory assistance call received from the public telephone network to the directory assistance center via a non-dedicated line; and call origination circuitry coupled to said connection circuitry that, following receipt of a telephone number from the directory assistance center, originates an extension call to said telephone number through a switch of the public telephone network and transmits to said switch, in conjunction with said extension call, at least a billing identifier captured from said incoming directory assistance call, wherein said call origination circuitry, after originating said extension call, releases said extension call to said public telephone network, such that said extension call and said incoming directory assistance call are connected together independent of said apparatus.

10. The apparatus of claim 9, wherein:

said at least one connection can convey both voice and data; and said apparatus receives said telephone number and billing information related to said extension call from said directory assistance center via said at least one connection.

11. The apparatus of claim 6, wherein said apparatus comprises a computer system.

12. A telephone network capable of handling directory assistance calls, said telephone network comprising:

one or more switches, wherein said one or more switches receive an incoming directory assistance call;

connection circuitry, coupled between said one or more switches and a directory assistance center, that connects the incoming directory assistance call to the directory assistance center; and call origination circuitry coupled to said connection circuitry that, following receipt of a telephone number from the directory assistance center, originates an extension call to said telephone number on the telephone network via a switch among said one or more switches and transmits to said switch, in conjunction with said extension call, at least a billing identifier captured from said incoming directory assistance call, wherein said call origination circuitry, after original said extension call, releases said extension call to said switch, and wherein said switch, in response to said release, extends said incoming directory assistance call into said extension call such that said extension call and said incoming directory assistance call are connected together independently of said call connection circuitry and call origination circuitry and said call connection circuitry and call origination circuitry are not involved in the connected call.

13. The telephone network of claim 12, wherein said call origination circuitry originates said extension call only in response to receipt of caller authorization via said incoming directory assistance call.

14. A telephone network capable of handling directory assistance calls, said telephone network comprising:
one or more switches, wherein said one or more switches receive an incoming directory assistance call;
connection circuitry, coupled between said one or more switches and a directory assistance center, that connects the incoming directory assistance call to the directory assistance center via a non-dedicated line; and
call origination circuitry coupled to said connection circuitry that, following receipt of a telephone number from the directory assistance center, originates an extension call to said telephone number on the telephone network via a switch among said one or more switches and transmits to said switch, in conjunction with said extension call, at least a billing identifier captured from said incoming directory assistance call, wherein said call origination circuitry, after originating said extension call, releases said extension call to said switch, and wherein said switch, in response to said release, extends said incoming directory assistance call into said extension call.

15. The telephone network of claim 14, wherein:
said at least one connection can convey both voice and data; and
said call origination circuitry receives said telephone number and billing information related to said extension call from said directory assistance center via said at least one connection.

16. The telephone network of claim 12, and further comprising a computer system including said connection circuitry and said call origination circuitry.

17. A program product, comprising:
a data processing system usable medium;
a directory assistance program encoded within said data processing system usable medium, wherein said directory assistance program includes:
connection code that causes a data processing system to connect an incoming directory assistance call received from a public telephone network to a directory assistance center, and
call origination code that, following receipt of a telephone number from the directory assistance center, causes the data processing system to originate an extension call to the telephone number through a switch of the public telephone network and transmit to the switch, in conjunction with said extension call, at least a bill identifier captured from said incoming directory assistance call, wherein said call origination code, after the data processing system originates said extension call, causes the data processing system to release said extension call to said public telephone network, such that said incoming directory assistance call and said extension call are connected by said public telephone network independently of the data processing system so that said data processing system is no longer involved in the connected call.

18. The program product of claim 17, wherein said call origination code causes the data processing system to originate said extension call only in response to receipt of caller authorization via said incoming directory assistance call.

19. A program product, comprising:
a data processing system usable medium;
a directory assistance program encoded within said data processing system usable medium, wherein said directory assistance program includes:
connection code that causes a data processing system to connect an incoming directory assistance call received from a public telephone network to a directory assistance center via a non-dedicated line; and
call origination code that, following receipt of a telephone number from the directory assistance center, causes the data processing system to originate an extension call to the telephone number through a switch of the public telephone network and transmit to the switch, in conjunction with said extension call, at least a billing identifier captured from said incoming directory assistance call, wherein said call origination code, after the data processing system originates said extension call, causes the data processing system to release said extension call to said public telephone network, such that said incoming directory assistance call are connected to said extension call and continue independent of the data processing system.

20. The apparatus of claim 6, and further comprising the directory assistance center.

21. The apparatus of claim 20, said directory assistance center including a switch and having a telephone number database.

22. The telephone network of claim 12, and further comprising the directory assistance center.

23. The telephone network of claim 22, said directory assistance center including a switch and having a telephone number database.

24. The method of claim 1, wherein originating an extension call comprises originating and extension call through an inter-exchange carrier switch.

25. The apparatus of claim 6, wherein the call origination circuitry originates the extension call through an inter-exchange carrier switch.

26. The telephone network of claim 12, wherein the switch comprises an inter-exchange carrier switch.

* * * * *